Figure 1:
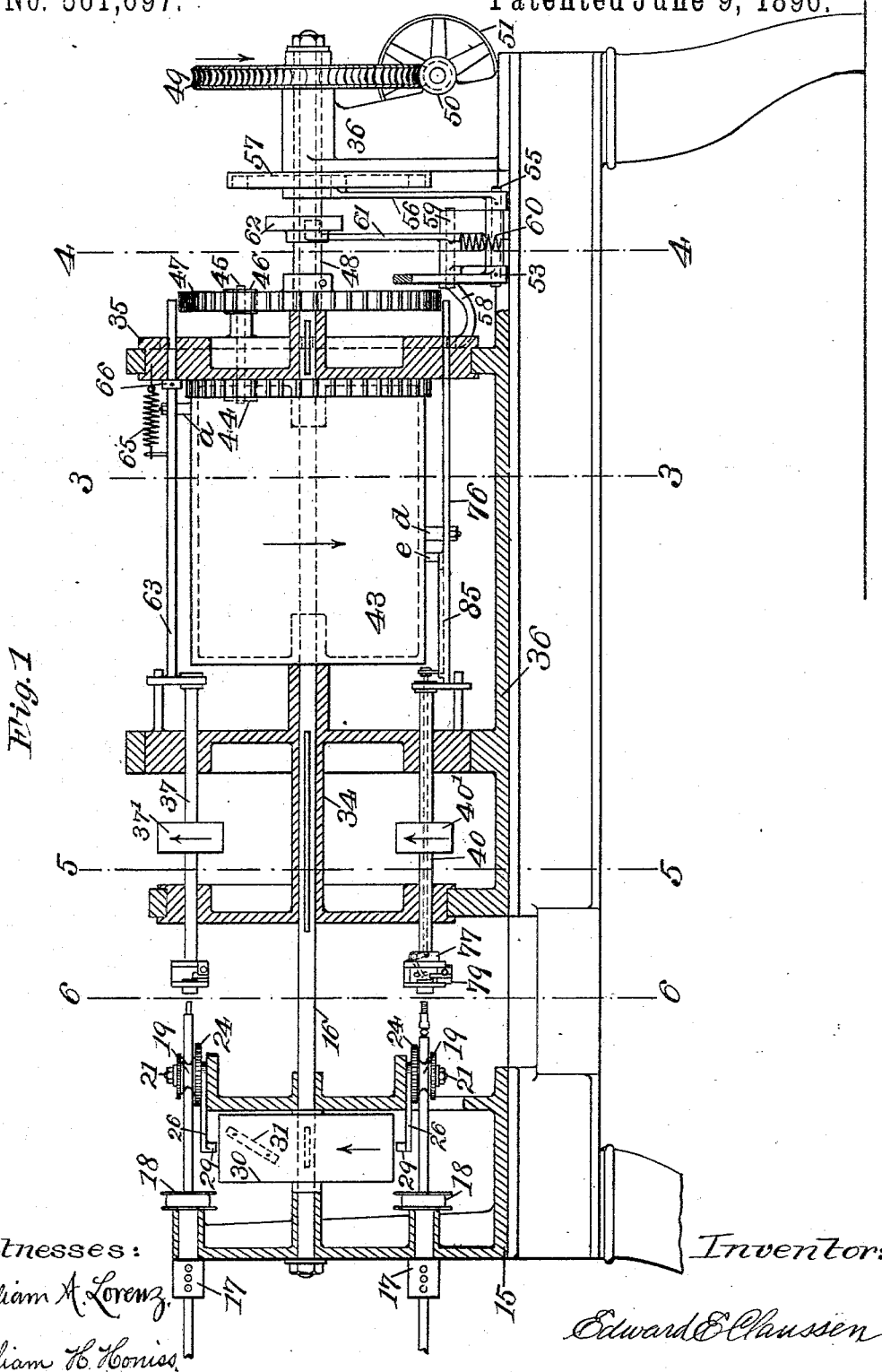

(No Model.) 10 Sheets—Sheet 1.

E. E. CLAUSSEN.
SCREW MACHINE.

No. 561,697. Patented June 9, 1896.

Witnesses:
William A. Lorenz.
William H. Honiss.

Inventor:
Edward E. Claussen (No Model.) 10 Sheets—Sheet 3.

E. E. CLAUSSEN.
SCREW MACHINE.

No. 561,697. Patented June 9, 1896.

Witnesses:
William A. Lorenz.
William H. Homiss

Inventor:
Edward E. Claussen (No Model.) 10 Sheets—Sheet 4.
E. E. CLAUSSEN.
SCREW MACHINE.
No. 561,697. Patented June 9, 1896.
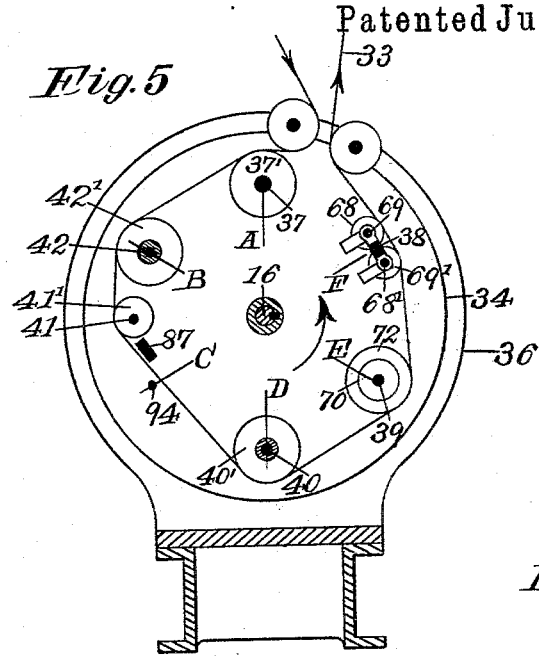
 
Fig. 26. Fig. 27.
Fig. 28. Fig. 29. Fig. 30. Fig. 31. Fig. 32. Fig. 33.
     
     
Witnesses:
William A. Lorenz
William H. Houiss
Inventor:
Edward E. Claussen

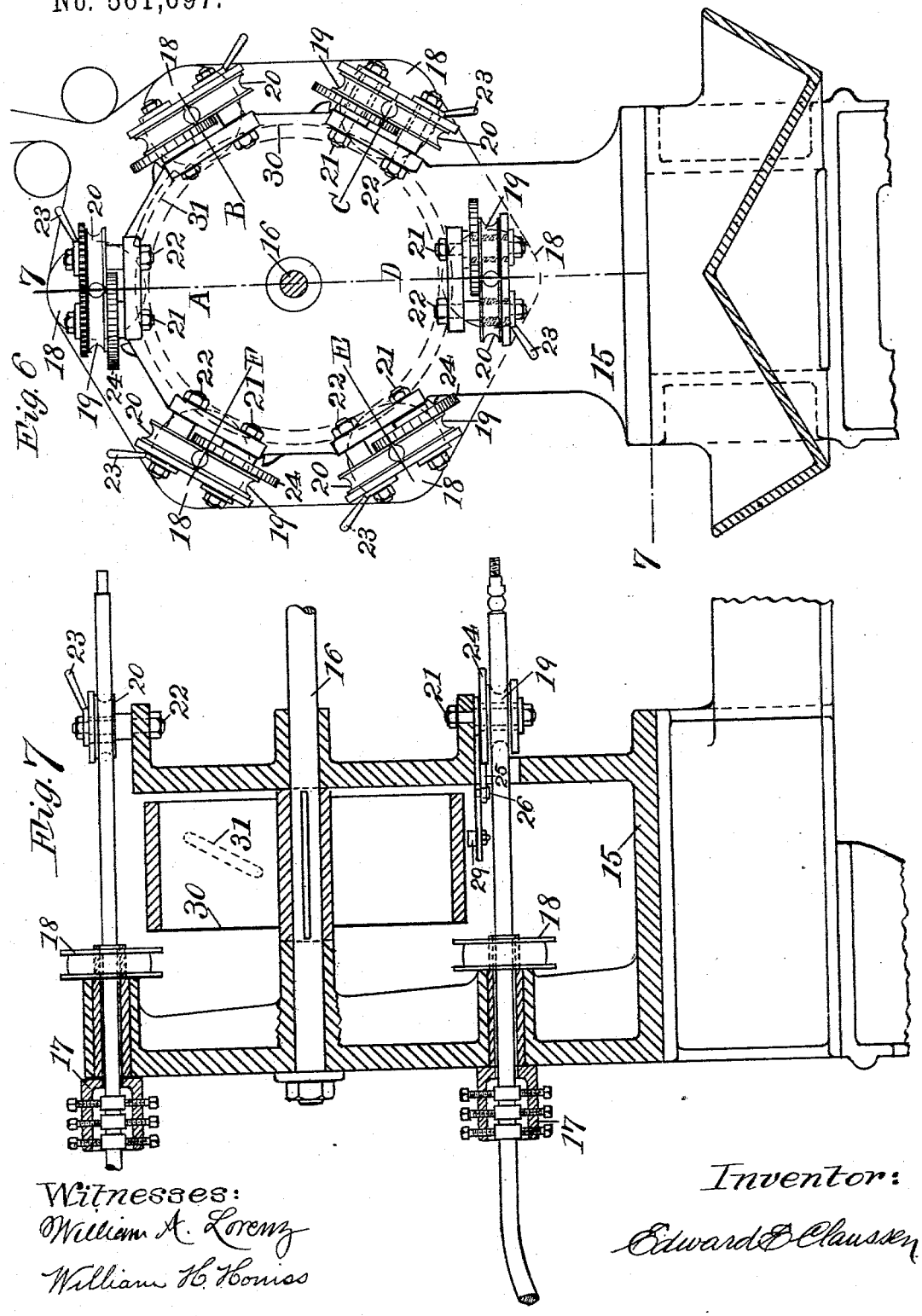

(No Model.) 10 Sheets—Sheet 6.

E. E. CLAUSSEN.
SCREW MACHINE.

No. 561,697. Patented June 9, 1896.

Witnesses:
William A. Lorenz
W. H. Homss.

Inventor:
Edward E. Claussen.

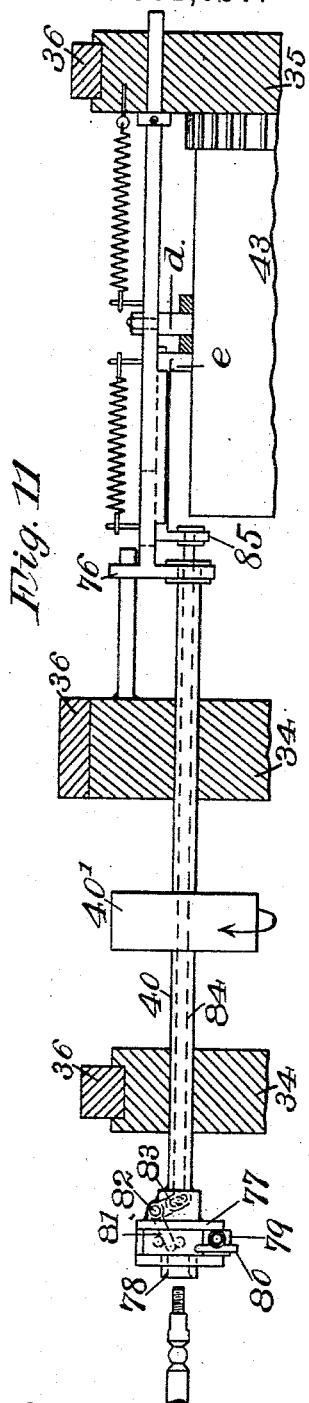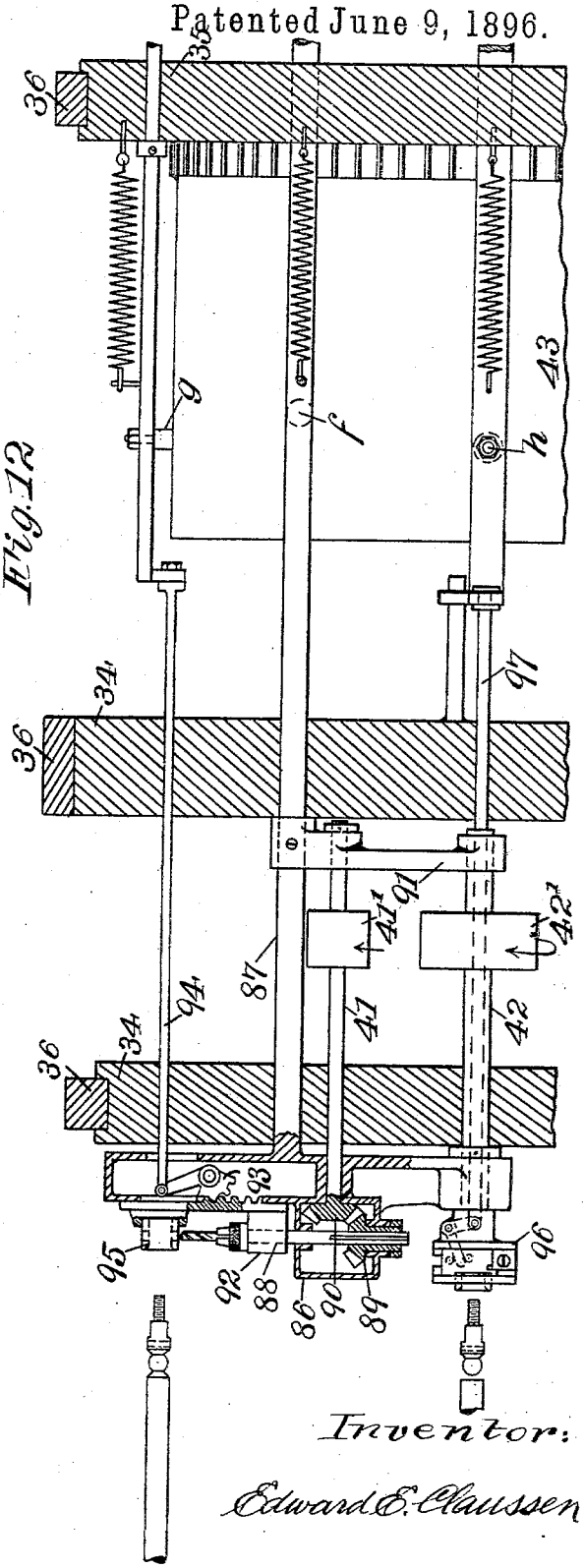

(No Model.) 10 Sheets—Sheet 8.

E. E. CLAUSSEN.
SCREW MACHINE.

No. 561,697. Patented June 9, 1896.

Witnesses:
William A. Lorenz
William H. Honiss

Inventor:
Edward E. Claussen (No Model.) 10 Sheets—Sheet 9.
E. E. CLAUSSEN.
SCREW MACHINE.
No. 561,697. Patented June 9, 1896.
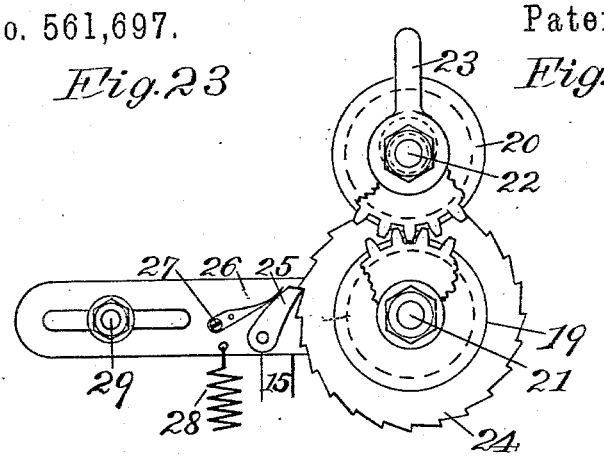
Fig. 23
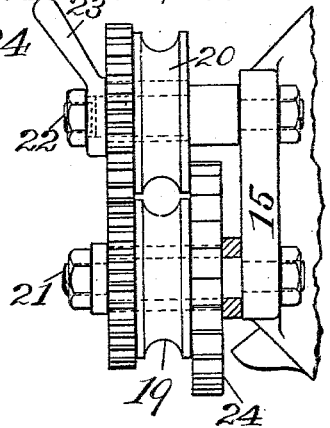
Fig. 24
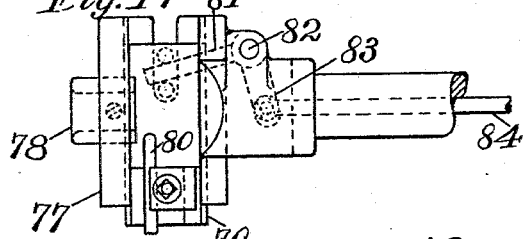
Fig. 17
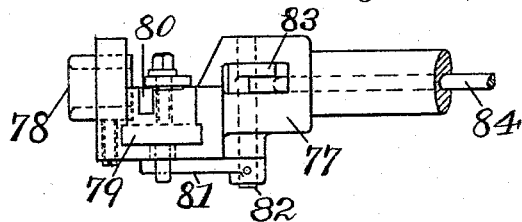
Fig. 18
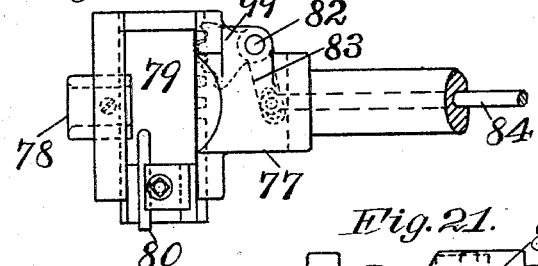
Fig. 20
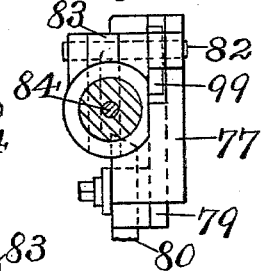
Fig. 19
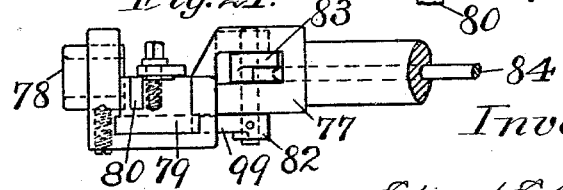
Fig. 21
Fig. 22
Witnesses:
William A. Lorenz
William H. Honiss
Inventor:
Edward E. Claussen (No Model.) 10 Sheets—Sheet 10.

E. E. CLAUSSEN.
SCREW MACHINE.

No. 561,697. Patented June 9, 1896.

Witnesses:
William A. Lorenz
William H. Homiss

Inventor:
Edward E. Claussen

UNITED STATES PATENT OFFICE.

EDWARD E. CLAUSSEN, OF HARTFORD, CONNECTICUT.

SCREW-MACHINE.

SPECIFICATION forming part of Letters Patent No. 561,697, dated June 9, 1896.

Application filed January 15, 1894. Serial No. 496,841. (No model.)

*To all whom it may concern:*

Be it known that I, EDWARD E. CLAUSSEN, a citizen of the United States, residing at Hartford, in the county of Hartford and State of Connecticut, have invented certain new and useful Improvements in Screw-Machines, of which the following is a full, clear, and exact specification.

This invention is a machine which is the embodiment of a new system of automatically manufacturing screws, pins, studs, binding-posts, bicycle-nipples, and numerous other objects which are or which can by means of this machine be made from wire rods. It moreover greatly enlarges the kind and scope of operations which can be automatically performed on these and similar objects which require to be duplicated many times, and therefore enables the manufacturer to produce rapidly and cheaply many such objects, which have heretofore either required supplemental operations to complete them or required to be produced by a series of manual operations.

In the machine of my present invention the wire stock is held in a fixed position while being operated upon by a series of revolving tools, and in this respect is somewhat similar to the machine shown and described in my Letters Patent No. 502,923, dated August 8, 1893, and No. 504,102, dated August 29, 1893. In the present machine, however, I employ a plurality of wire holding and feeding devices, arranged in a circle and parallel with a common center, and have a similar number of tool-carrying devices so arranged as to present a tool to each of those wire rods, those devices being journaled in a head which is capable of intermittent rotation, so that each tool is successively presented to each of the wire rods for the performance of its particular work thereon. Thus the work of the tools upon the rods is only interrupted for the brief time required to index the tool-head to its next position, whereas in the case of machines using but one wire rod each tool remains idle while the others in succession do their work thereon. Important features of this invention are the devices for flattening or squaring the blank and for drilling transverse holes therein before severing them from their respective rods.

Reference is made to the accompanying drawings, in which—

Figure 2:
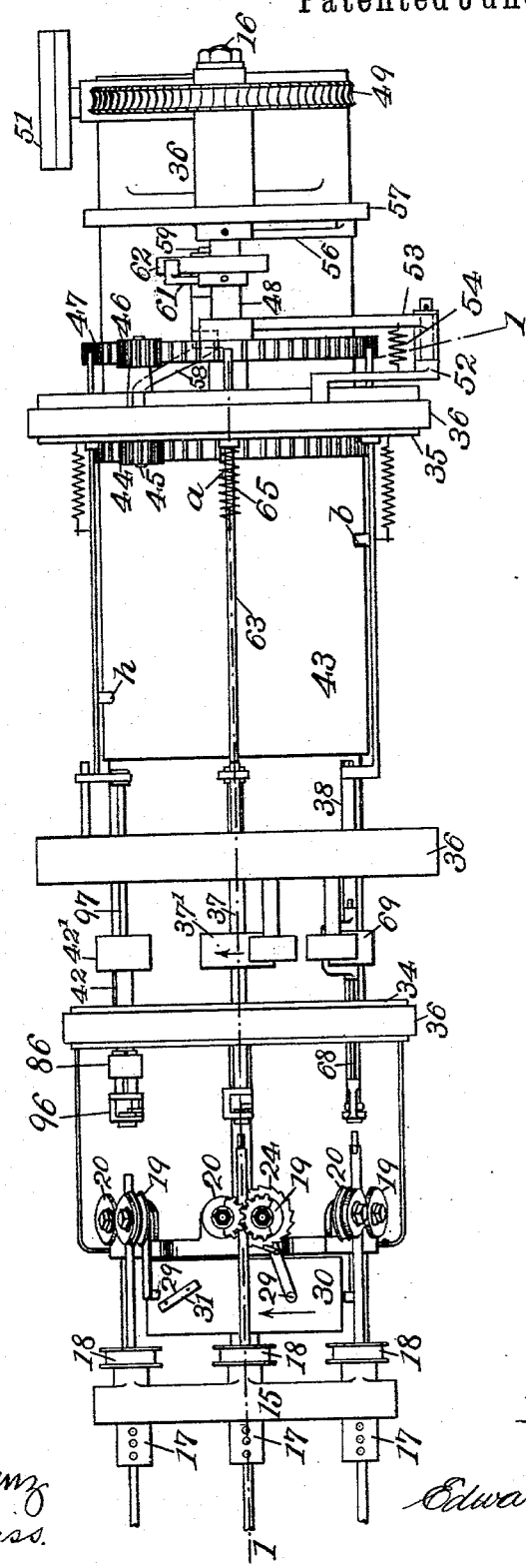
Figure 3:
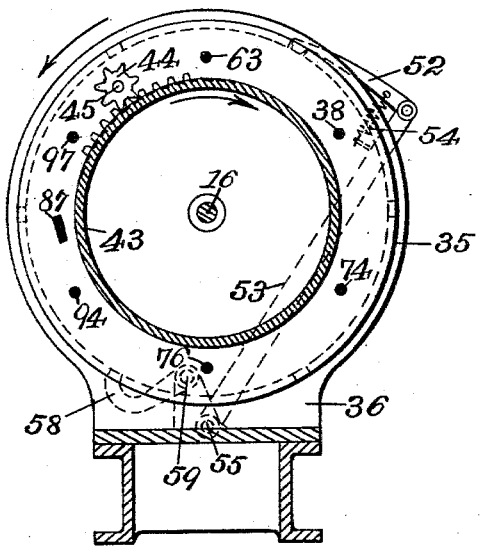
Figure 4:
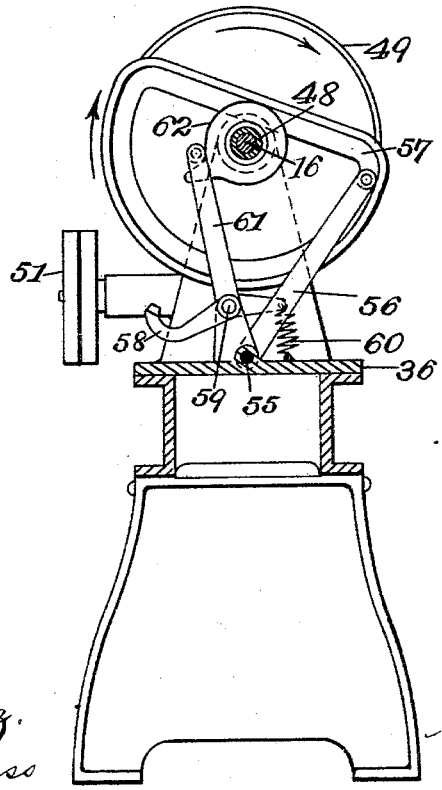
Figure 8:
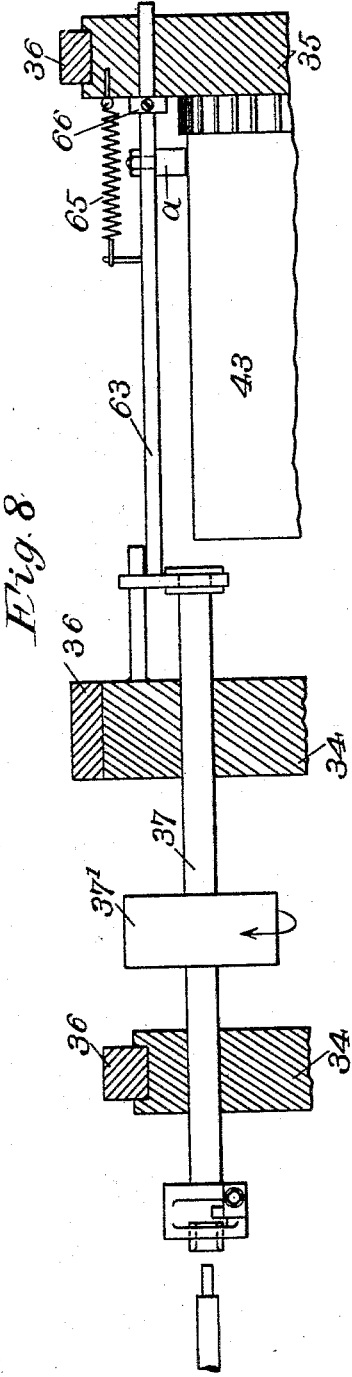
Figure 13:
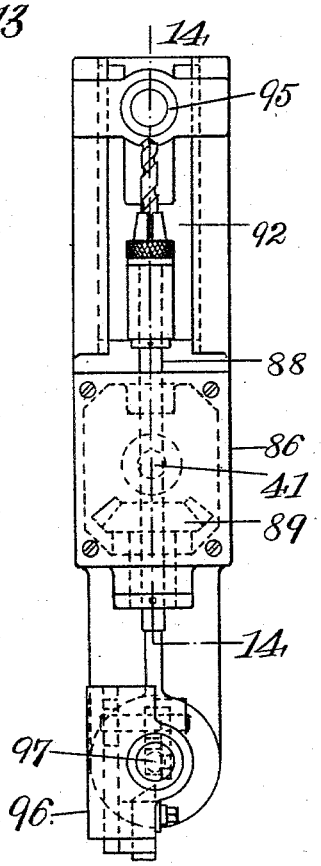
Figure 14:
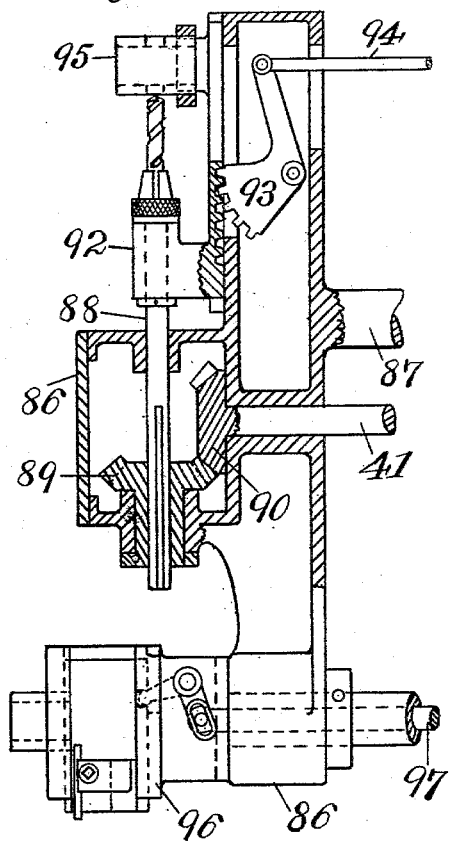
Figure 15:
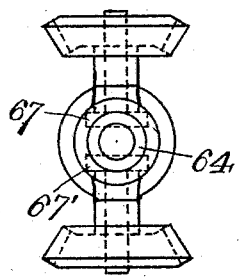
Figure 16:
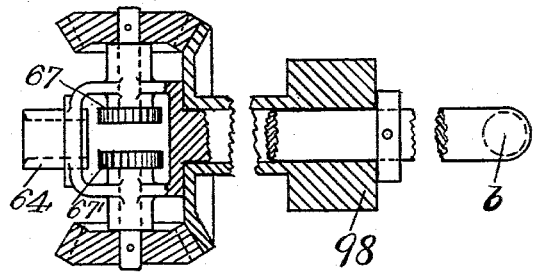
Figure 25:
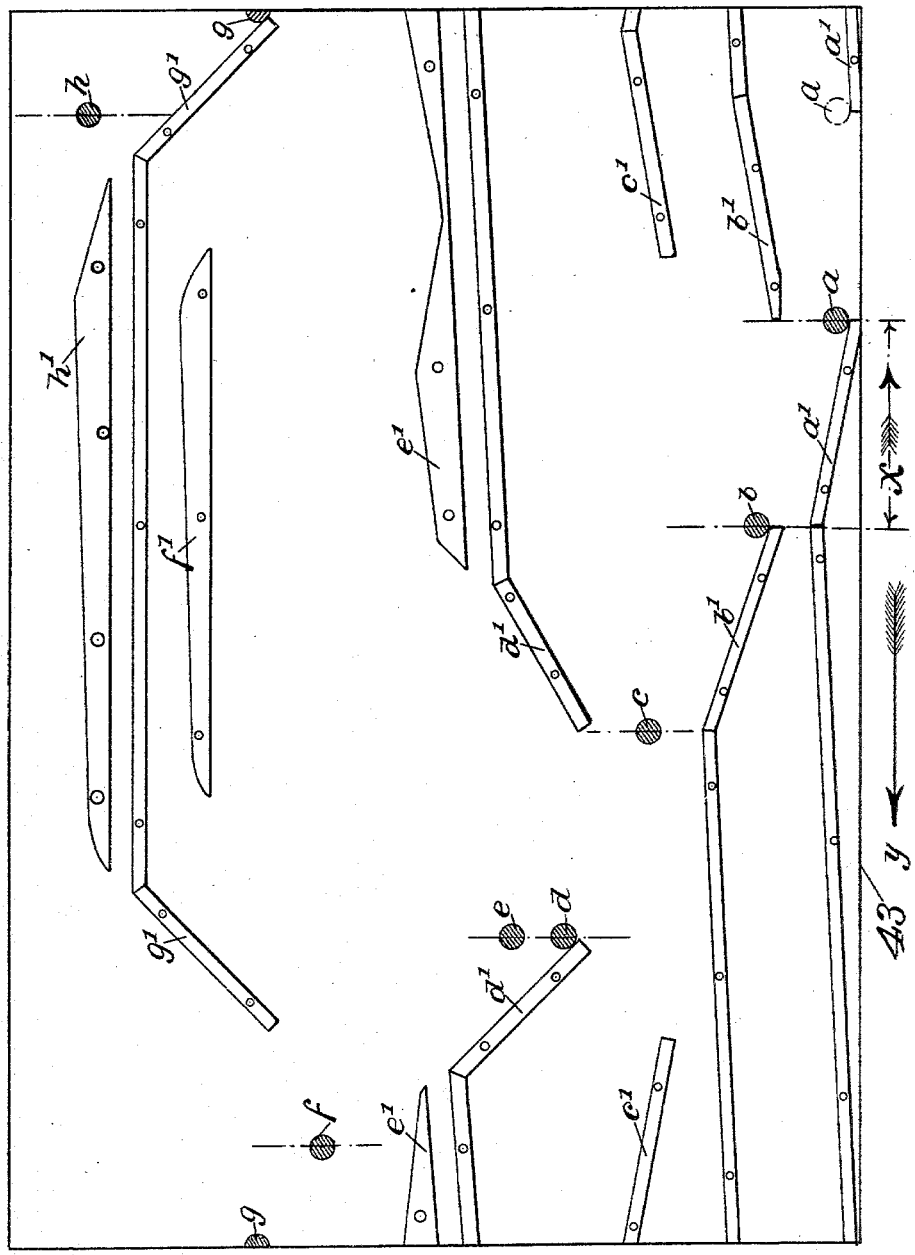

Figure 1 is a front side view of my machine, partly in section, taken on the line 1 1 of Fig. 2. Fig. 2 is a plan view of the machine of Fig. 1. Fig. 3 is a sectional end view, taken on the line 3 3 of Fig. 1, looking toward the right. Fig. 4 is a sectional end view, taken on the line 4 4 of Fig. 1, showing the parts which index the tool-head to its various positions and also those parts which lock it in those positions. In order to show the locking-bolt, the section-line 4 4 is supposed not to pass through that bolt or its shaft. Fig. 5 is a sectional end view, taken on the line 5 5 of Fig. 1, showing the arrangement of the tool-spindles. Fig. 6 is a sectional end view, taken on the line 6 6 of Fig. 1, showing the series of wire holding and feeding devices. Fig. 7 is a sectional side view, taken on the line 7 7 of Fig. 6, showing the wire straightening and feeding devices. Figs. 8 to 12, inclusive, are enlarged side views of the respective tools and their spindles shown in the preceding figures, each spindle being shown separately, with enough of its environment to enable its mode of operation and its relation to the other spindles to be understood. As herein shown, these spindles are provided with tools adapted to produce studs like that shown in its progressive stages of manufacture in Figs. 28 to 33, inclusive, and at the left-hand ends of the several Figs. 8 to 12. In the latter figures the tools are represented as having just withdrawn from their respective blanks after each has performed its special operation theron, and they are therefore in the position occupied by them just prior to being indexed forward one space. Fig. 8 shows the cutting-down spindle, Fig. 9 the flattening, Fig. 10 the threading, Fig. 11 the forming, and Fig. 12 the drilling and cutting-off spindles. Fig. 13 is an enlarged end view of the drilling and cutting-off tools shown in Fig. 12, while Fig. 14 is a side view of the same, partly in section, taken on the line 14 14 of Fig. 13. Figs. 15 and 16 are respectively an end and a side view of a modified arrangement of my device for milling the flattened sides of the stud. Figs. 17, 18, and 19 are respectively a plan, a side, and an end view, drawn to a larger scale, of my forming device of Fig. 11, showing more clearly its construction. Figs. 20, 21, and 22 are a plan, a side, and an end view, respectively, of a modified construction of the forming devices. Fig. 23 is a plan view, and Fig. 24 an end view, showing, in enlarged scale, the construction and arrangement of one of the series of wire holding and feeding devices of Figs. 6 and 7. Fig. 25 is a development of the periphery of the cam-wheel 43, showing the relative positions of the spindles by their cam-pins and the cam-strips which operate them. In this figure, as in Figs. 8 to 12, inclusive, the spindles are represented as being at the rearward limits of their respective movements, ready for indexing to the succeeding position. Fig. 26 is a side view of a bicycle-nipple, and Fig. 27 is a side view of a binding-post, those objects being shown as illustrations of work which this machine may be adapted to produce automatically. Figs. 28 to 33, inclusive, are enlarged views illustrating the progressive stages in the manufacture of the stud of Fig. 33, each figure consisting of a side and an end view of the blank. Fig. 28 represents the blank after the tool of Fig. 8 has cut it down to the body size. Fig. 29 shows the addition of the flattening-cuts made by the devices of Fig. 9. Fig. 30 shows the threading by the die of Fig. 10. Fig. 31 shows the addition of the forming-cuts, Fig. 32 the addition of the transverse hole, and Fig. 33 shows the completed stud severed from the rod.

The construction and arrangement of the parts will next be described.

The rod-holding section consists of the parts which advance the wire rods as required and which hold them against rotation while the tools are operating thereon, and that section is best shown in Figs. 6 and 7. The standard 15 is fixed on the main bed of the machine and forms a bearing for one end of the main shaft 16. The several rod-holding devices are mounted on the standard 15, and are arranged at equal distances about a circle which is concentric with the main shaft. As these rod-holding devices are duplicates of each other a description of the uppermost one at A will suffice. The rod-straightening portion is best seen in Fig. 7, and consists of a sleeve 17, provided with collars and set-screws in the usual way, and having fixed to it the pulley 18, which is driven by a belt from any convenient counter-shaft passing around the series of pulleys, as shown in Fig. 6. The rod is drawn through the straightener by the geared feeding-rolls 19 and 20, mounted on the studs 21 and 22, which are attached to the standard 15. The roll 20 turns upon the eccentric 23, by means of which it is adjusted toward or from the roll 19 to suit the different sizes of wire, and that eccentric is clamped to place by the nut on the stud 22. The roll 19 has fixed upon it the ratchet 24, which is operated by the pawl 25, pivoted on the arm 26, one end of which is loosely mounted on the stud 21. The pawl 25 is held in contact with the ratchet by the spring 27. The arm 26 is normally held back against a stop on the standard by the spring 28, and is provided with a pin 29, which may be clamped at any position along its slot. A cam-wheel 30 is fixed upon the main shaft 16 and carries the cam-piece 31, which is adapted to engage the pin 29 and move the ratchet a suitable amount to feed the desired length of rod.

The tool-carrying section comprises a series of spindles and slides corresponding in number and relative position to the rod-holding devices mounted on the heads 34 and 35, which are journaled in the standard 36 and are keyed to the shaft 16.

The term "spindle" is for clearness herein applied to each of the respective organizations of parts which carry and operate the several tools, comprising also the slide and the cam pin or pins which operate each of those organizations.

The spindles are provided with tools, which all operate at the same time upon different rods, and they are rotated by a belt 33 from any convenient counter-shaft which passes around the series of pulleys, as shown in Fig. 5, and they are pushed forward by their respective cam-strips on the cam-wheel 43. That cam-wheel turns freely on the main shaft 16, and is provided with gear-teeth, which mesh with those of the pinion 44, fixed on one end of the shaft 45, journaled in the head 35. The other end of that shaft has fixed upon it the pinion 46, which meshes with the gear 47, fixed on one end of the hollow shaft 48. That shaft is journaled in the standard 36 and has fixed upon its outer end the worm-gear 49, which is driven by the worm 50 and pulley 51. Thus the cam-wheel 43 is driven at a regular rate of speed in the direction of the arrow shown thereon in Fig. 1. The hollow shaft 48 serves also as a bearing for that end of the main shaft 16. The periphery of the head 35 has spaced around it at equal intervals a series of indexing-notches corresponding in number and position to the tool-spindles.

An indexing-pawl 52 is pivoted on the indexing-arm 53, and is adapted to engage with the notches in the head 35, being held into engagement with them by the spring 54. The arm 53 is fixed to one end of the shaft 55, which is journaled in the standard 36 and has fixed upon its other end the cam-arm 56, which is engaged and operated by the cam 57, fixed on the shaft 48, and best shown in Figs. 3 and 4. The cam 57 is so shaped that at each revolution it causes the pawl 52 to partially rotate the head 35 to an angular extent equal to that by which the spindles are separated. The head 35 is locked in its respective positions by the bolt 58, which is fixed on one end of the shaft 59 and is adapted to engage one of the index-notches in the head 35, being held in engagement therewith by the spring 60. The other end of that shaft has fixed upon it the cam-arm 61, which rests against the cam 62, fixed on the shaft 48, and is moved by that cam for the purpose of unlocking the head 35 when that head is to be indexed to the next position.

The tool-spindles will now be described. Those shown in the drawings are adapted to perform six operations upon each of the six rods. In the arrangement herein shown the first spindle to operate on the rod is that shown in Fig. 8, which carries and operates the cutting-down tool. This is an ordinary box-tool, consisting of a bushing for steadying the rod and a tool for turning it down, and is fixed to the shaft 37, which is journaled in the two flanges of the head 34 and has fixed upon it the pulley 37'. The rearward end of the shaft is made with two collars, between which the yoke 63 is journaled. That yoke is guided at its front end by a projection of the head 34, and its rearward end passes through a hole in the head 35. A cam-pin $a$ is fixed to the yoke and is engaged by a cam-piece $a'$ on the cam-wheel 43. (Best shown in Fig. 25.) The yoke is pressed back toward the head 35 by a spring 65, and is stopped at the desired limit of its stroke by the collar 66 against the head 35. Each of the spindles is thus operated by a yoke, the rearward end of which passes through the head 35 and is provided with a similar cam-pin, spring, and stop-collar, and it will be therefore unnecessary to describe each of them in connection with their respective spindles.

Figure 9:
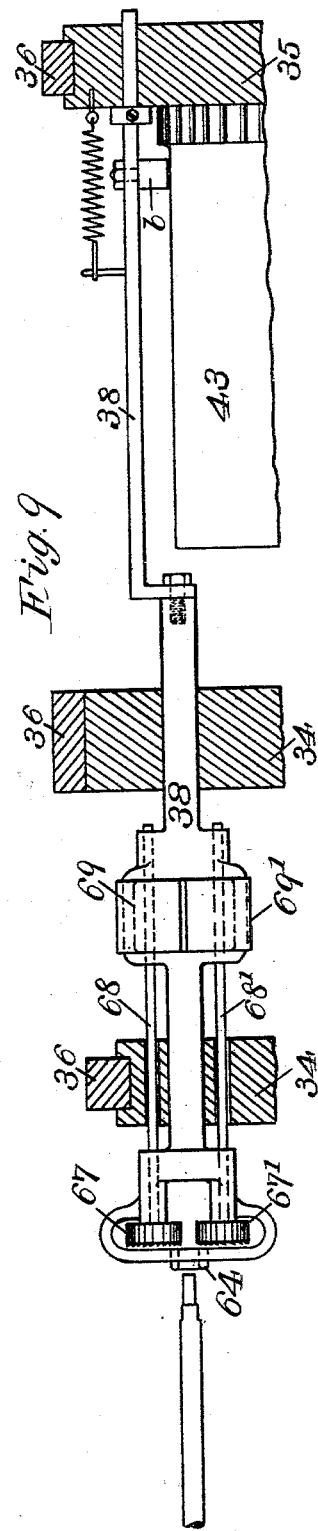

The spindle shown in Fig. 9 is adapted to flatten off one or more sides of the rod. As herein shown, it is adapted to flatten two opposite sides, and consists of a slide 38, carrying two milling-cutters 67 and 67', which are fixed on the ends of the shafts 68 68', journaled in the slide 38. Those shafts are rotated by means of the pulleys 69 69', fixed thereon and driven by a belt, as shown in Fig. 5. As the slide 38 does not rotate, the part of this spindle which corresponds to the yoke 63 of Fig. 8 may be integral with the slide, and the latter may be square instead of round at its bearings in the head 34. It is caused to reciprocate by the cam-pin $b$ and cam-piece $b'$. The front of the slide is provided with the bushing 64 to receive and support the rod while being milled.

Figure 10:
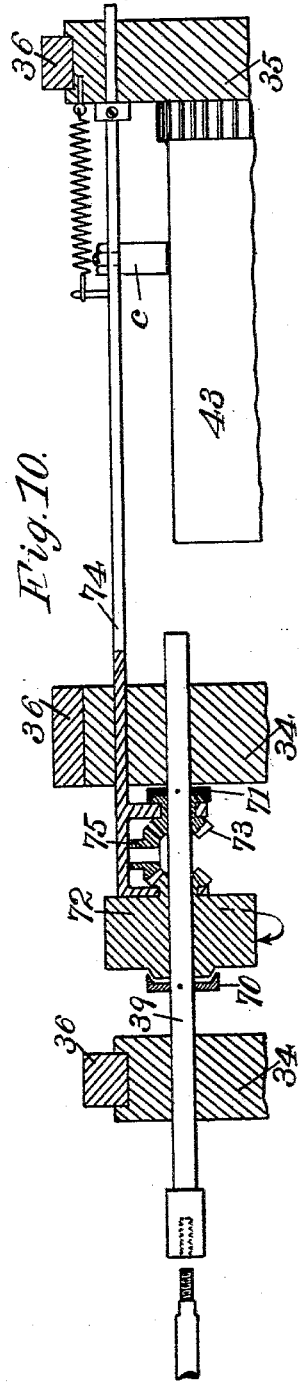

The threading-spindle is represented in Fig. 10 and consists of a die-holding shaft 39, which is journaled in the head 34 and has fixed upon it the friction-collars 70 and 71. The pulley 72 and the bevel-gear 73 turn freely on the shaft 39 and are grooved to receive the yoke 74, which therefore serves to hold them a constant distance apart. The intermediate bevel-gear 75 turns freely on a stud on the yoke 74 and meshes with the gear 73 and with a similar bevel-gear formed on the side of the pulley 72, so that the gear 73 and the pulley 72 are rotated in opposite directions. By means of the yoke and its pin $c$ and cam-piece $c'$ on the wheel 43 either the pulley or the gear 73 may be pushed into contact with their respective friction-collars 70 or 71, thus rotating the shaft in either direction, as may be required.

Fig. 11 represents a spindle for turning the blank to any form desired for utility or finish. It consists of the hollow shaft 40, which is rotated by means of the pulley 40' and is moved lengthwise by means of the yoke 76, its cam-pin $d$, and cam-piece $d'$. The construction of the tool carried on its working end is best shown in Figs. 17, 18, and 19. It consists of a head 77, provided with a bushing 78, and a cross-slide 79, the latter having a tool 80 clamped thereon. The cross-slide is operated by means of a lever 81, engaging therewith and fixed on one end of the shaft 82, which is journaled in the head 77. The upper end of that shaft has fixed upon it the arm 83, to which is attached the rod 84, which passes through the hollow shaft 40 and is journaled at its rearward end in the auxiliary yoke 85. That yoke is fitted to slide in ways upon the yoke 76 and is provided with its own spring, cam-pin $e$, and cam-piece $e'$ on the cam-wheel 43, by means of which any suitable lengthwise motion may be imparted to the auxiliary yoke 85 and its rod 84 independently of the motion of the principal yoke 76. By suitably adapting the form of the cam-pieces the blank may be turned to almost any desired form.

The spindle for drilling transverse holes in the blank is best shown in Fig. 12 and consists of a head 86, having a shank 87, which is fitted to slide in the heads 34 and 35, and therefore forms its own yoke, moved by its cam-pin $f$ and cam-piece $f'$. Journaled in the head 86, with its axis transverse to that of the blank, is a drill-spindle 88, which is splined in the bevel-gear 89. That gear is journaled in the head 86 and is rotated by the gear 90, fixed to the shaft 41, on which is also fixed the pulley 41', driven by the belt 33. The shaft 41 is journaled in the head 86 and in the arm 91, which is fixed on the shank 87 of the head 86. The drill-spindle 88 is also journaled in the slide 92, which is fitted upon the head 86 and is provided with rack-teeth meshing with those of the sector-gear 93, pivoted on the head 86. That sector is connected by the rod 94 to its yoke, which is operated by the cam-pin $g$ and cam-piece $g'$, by means of which the slide 92 is caused to reciprocate at suitable times to feed the drill to and from the blank, the drill-spindle being provided with a collar on each side of the slide 92. A bushing 95 on the head 86 is adapted to steady the blank and guide the drill.

The cutting-off spindle, as herein shown in Figs. 12, 13, and 14, is to a certain extent combined with the drilling-spindle just described. The tool-head 96 is similar in construction to the forming-tool head 77, (shown in Figs. 17, 18, and 19,) and is carried by the hollow shaft 42, rotated by the pulley 42'. That shaft is journaled in the head 86 and in the arm 91, by means of which it is moved to and from its operative position relative to the blank. A rod 97 passing through the hollow shaft 42 connects the lever of the cross-slide with its cam-yoke in a manner similar to the connections of the forming-tool spindle above described, and is operated by the cam-pin $h$ and cam-piece $h'$.

The relative positions and longitudinal movements of the several spindles may best be seen by reference to Fig. 25, wherein their cam-pins and cam-pieces are represented in the positions occupied by them when each tool has performed its work upon the respective blanks and they are about to be advanced one place. The cam-wheel 43 turns steadily in the direction of the arrow $y$, while the tool-heads 34 and 35 are intermittently indexed in the opposite direction to an extent represented by $x$, equal to the angular separation of the wire rods. Thus each tool is carried into line with the blank upon which the immediately preceding tool has just completed its operation. The cam-wheel 43 is so geared as to make less than a complete revolution for each revolution of the indexing-cam, to an angular extent equal to that which separates the spindles, in order that each cam-pin shall meet the same portion of its cam-piece immediately upon its arrival at each of its indexed positions. For this reason the relative revolutions of the cam-wheel 43 and the indexing-cam 57 must be as five to six, where six spindles are employed, as in the present machine. This is done by making the relative number of teeth of the cam-wheel 43 and the gear 47 in the ratio of six to five.

The mode of operation of the machine is as follows, assuming that each of the feeding devices is provided with a rod of stock and the machine in the position shown in Fig. 1. In that position the tools have just withdrawn from their respective rods, leaving blanks at the positions A F E D C B (shown in Figs. 5 and 6) like those of Figs. 28, 29, 30, 31, 32, and 33, respectively. The tool-head is now indexed one place in the direction of the arrow in Fig. 5, by the operation of the unlocking and indexing mechanism, as previously described. This movement carries with it the feed-cam 30, which, by means of its cam-piece 31, operates to feed forward the rod in the position B, from which the blank has just been severed by the cutting-off spindle 42, so that the cutting-down spindle 37 on its arrival at position B may have there a new rod end to operate upon. The position of the cam-pin $a$ of that spindle with relation to its cam-piece $a'$ may be seen in Fig. 25, wherein the two positions of the pin $a$ represent the amount indexed, the dot-and-dash position being that in which it commences its work on the blank. As the cam-wheel 43 continues to revolve, the revolving tool is fed to its cut by the cam-piece $a'$, which is so formed as to allow the spindle to be drawn back by its spring 65 when the cut is finished. In a similar way the cam-pin $b$ is fed forward and back by its cam-piece $b'$ to carry the flattening-cutters (shown in Fig. 9) to their work, and the cam-pin $c$ is carried by its cam-piece $c'$, pressing the pulley 72 against the collar 70 for running the die onto the blank, and the reversing-gear 73 against the collar 71 for running it off.

The cam-pin $d$ is carried forward by the cam-piece $d'$ for the forming operation of the spindle 40, and when the tool has reached the position where it is to operate the pin $e$ is engaged by its cam-piece $e'$ and by its connections with the cross-slide moves the tool toward and from the center of the blank, as required, for the shape to be turned. At the end of its cut the tool is drawn clear of the diameter of the blank and the spindle is withdrawn.

The cam-pin $f$ and cam-piece $f'$ serve to move the head 86 far enough to bring the drill and the cutting-off tool (shown in Fig. 12) opposite the respective points where they are to operate upon the blanks, when the pins $g$ and $h$ are moved by their respective cam-pieces $g'$ and $h'$, respectively, to feed the drill and the cutting-off tool to their work. Then those pins are drawn back until the drill and the cutting-off tools are clear of their respective blanks, when the head 86 is drawn back to its first position.

It will be understood that the several operations just described are performed simultaneously upon the different blanks and that six of those blanks are completed and cut off at each complete revolution of the spindle-heads 34 and 35.

A modified construction of my devices for flattening the blank is shown in Figs. 15 and 16, in which the milling-cutters are arranged with their axis in line with each other and at right angles to that of the blank and are driven by bevel-gearing from the pulley 98. Figs. 20, 21, and 22 represent a modification of the means for operating the cross-slide 79 of the forming or cutting-off tools, which consists in forming gear-teeth upon the slide and using a toothed sector 99 to mesh therewith in the place of the lever 81. The herein-described construction of the spindles may be modified in many ways to adapt them to produce other forms of blanks. Where it is desired to flatten four sides of a blank, like that of Fig. 26, a spindle like that of Fig. 9 may be substituted for the drilling-spindle of Fig. 12 and arranged to make its cuts at right angles to those of the first spindle, or two drilling-spindles may be employed where it is required to drill two holes. The number of spindles may also be lessened or increased to suit the work to be done, in which case a suitable relation of the revolutions of the indexing-cams and the cam-wheel 43 must be maintained, as above described.

The drilling and cutting-off tools are herein represented as being to some extent combined. It is, however, to be understood that these may be arranged and operated quite independently of each other.

I claim as my invention—

1. A series of devices arranged side by side at equal intervals in a circle, each of those devices consisting of rolls adapted to hold a wire rod from rotating, and to feed it in the direction of its length, and a cam-wheel journaled concentrically therewith, adapted to advance by regular partial rotations of an angular extent equal to that by which the rod-holding devices are separated, and adapted to operate the rod-feeding devices in succession as the wheel is thus intermittently rotated, the parts being combined substantially as described.

2. A series of rod holding and feeding devices arranged side by side in a circle, a cam-wheel 30 journaled concentrically with and adapted to operate those rod holding and feeding devices, a cam 57 and its intermediate mechanism adapted to rotate the cam-wheel 30 by regular partial revolutions, all arranged and operating substantially as described to feed forward one rod at a time in regular succession.

3. A series of rod holding and feeding devices arranged side by side in a circle, each device consisting of a pair of rolls adapted to grip a rod between them, and provided with a ratchet, a pawl, and a pawl-arm, in combination with an intermittently-rotating cam journaled concentrically with the rod-holding devices, and operating to successively engage and operate the respective pawl-arms for the purpose specified, substantially as described.

4. A series of devices arranged side by side in a circle, each of those devices consisting of a pair of rolls adapted to hold a rod or wire from rotating, an intermittently-rotating cam, and connecting means adapted to rotate each of those pairs of rolls in succession, whereby their rods are intermittently fed in the direction of their length, a series of spindles mounted side by side in an intermittently-rotating head and carrying revolving tools, combined and operating substantially as described to present those tools successively to those wire rods.

5. A series of tool-holding devices arranged side by side in a head which is capable of intermittent rotation in one direction, with a cam-wheel journaled concentrically with that head and adapted to rotate in the opposite direction, with operating means connecting the cam-wheel with the tool-holding devices, combined and operating substantially as described to advance and retract those devices.

6. A series of pairs of rod holding and feeding devices arranged side by side in a circle, a cam-wheel journaled concentrically with and adapted to operate those devices in succession, a revolving tool-carrying spindle mounted on a head which is journaled concentrically with the rod-holding devices, a cam 57 and connecting mechanism adapted to index the revolving tool to each rod of the series in succession, and a cam-wheel journaled concentrically with the tool-carrying head, and operating to impart a suitable feed-motion to the revolving tool as it is presented to each rod, the parts being combined substantially as described.

7. A series of pairs of rod holding and feeding rolls arranged side by side in a circle, a cam-wheel journaled concentrically with the series, with connecting means adapted to operate those pairs of rolls in succession, a series of revolving tools mounted on head, which is journaled concentrically with the rod-holding devices, a cam 57 and connecting mechanism adapted to index the series of revolving tools successively to each of the wire rods, and a cam-wheel journaled concentrically with the tool-carrying head, with connecting means operating to impart to each of the tools an independent feed motion suitable for its special operation upon the rod, all combined and operating substantially as described.

8. The combination of a tool-slide, a head on which that slide is mounted, a cam and its connections adapted to index the head in intermittent partial revolutions in one direction, a cam-wheel journaled concentrically with the head, adapted to rotate in the opposite direction and operatively connected with the tool-slide, whereby each partial revolution of the head, combined with that of the cam-wheel, amounts to one complete rotation of the cam-wheel with relation to the head and its slide at each of the indexed positions of that slide, substantially as described.

9. A series of revolving tools, a head on which those tools are mounted, a cam 57 and its connections adapted to index the head by intermittent partial revolutions in one direction, a cam-wheel 43 journaled concentrically with the head, adapted to rotate in the opposite direction and having independent cam-surfaces adapted to operate the respective tools, all so arranged that the relative rotations of the head and the cam 43 shall be as one is to a number representing one less than the number of tools, combined and operating substantially as described and for the purpose specified.

10. The combination of heads 34 and 35 fixed upon a shaft and carrying a series of tool-slides, with means substantially as described for unlocking, indexing, and relocking the heads, a cam-wheel journaled between the heads upon the shaft, and adapted to operate the tool-slides, means for imparting to the cam a rotary motion, consisting of a shaft journaled in one of the heads, having a pinion on one end engaging with teeth on the cam-wheel, and a pinion on the opposite end engaging with a driving-gear journaled concentrically with the cam-wheel, substantially as described.

11. In combination with means for holding a rod or wire from rotating, the revolving tool-carrying spindle 37, the yoke 63, the cam-pin

*a*, and the cam-strip *a'* arranged and operating to feed the spindle to and from the rod, substantially as described.

12. In an automatic screw-machine, in combination with means for holding a rod or wire from rotating, a slide, carrying a milling-cutter adapted to flatten the rod, and a bushing carried by the slide and adapted to pass upon and support the rod while being milled, substantially as described.

13. In an automatic screw-machine, in combination with means for holding a wire rod from rotating, a slide carrying the bushing 64 and having journaled thereon the milling-cutters 67 and 67', the cam-pin *b*, and cam-strip *b'*, adapted to operate the slide, substantially as described.

14. The herein-described threading device, consisting of the die-spindle 39, the friction-collars 70 and 71, the yoke 74 having the pulley 72 and the gear 73 and 75 mounted thereon, and a cam adapted to engage the yoke, whereby the friction-collars are engaged by the pulley or by the gear 73 respectively, combined and operating substantially as described.

15. The combination of a principal yoke 76, an auxiliary yoke fitted to slide thereon, a hollow spindle and a rod revolubly connected with the principal and the auxiliary yoke respectively, and adapted to slide one within the other, an intermittently-rotating head on which the above-mentioned devices are mounted, with a cam-wheel adapted to engage with the yokes and impart to the spindle and the rod independent reciprocating motions, substantially as described.

16. In an automatic screw-machine, the herein-described means for locating and drilling a transverse hole in the blank, consisting of a drilling-spindle revolubly mounted on a head with its axis transverse to that of the blank, and a bushing carried on the head, adapted to pass upon the blank and guide the drill, combined and operating substantially as described.

17. In combination with means for holding a rod or wire from rotating, a transverse drilling device consisting of a drilling-shaft mounted on a head which is adapted to move the shaft to the desired position on the rod, and a bushing adapted to pass upon and support the rod, substantially as described.

18. In combination with means for holding a rod or wire from rotating, a transverse drilling device, consisting of a drill-shaft mounted on a head which is adapted to move the shaft to the desired position on the rod, means for moving the head longitudinally and feeding the drill-shaft transversely to the rod, and a bushing adapted to support the rod and guide the drill, substantially as described.

19. The combination of the drilling-head 86, a cross-slide mounted thereon, a drill-spindle journaled in the slide, a lever 93 and its rod connected with the cross-slide, and the cam-pieces *f'* and *g'* adapted to operate the head and the slide respectively, substantially as described.

EDWARD E. CLAUSSEN.

Witnesses:
WILLIAM A. LORENZ,
WILLIAM H. HONISS.